United States Patent [19]

Cadwallader et al.

[11] Patent Number: 5,051,000

[45] Date of Patent: Sep. 24, 1991

[54] LINEAR COMPENSATING BEARING

[76] Inventors: Robert H. Cadwallader, P.O. Box 418, RR 1, Clinton Corners, N.Y. 12514; Charles P. Coughlin, Spring St., Box 71, Chelsea, N.Y. 12512; Thomas J. Walsh, 2 Deer Run Rd., Poughkeepsie, N.Y. 12603

[21] Appl. No.: 442,187

[22] Filed: Nov. 28, 1989

[51] Int. Cl.⁵ ............................................. F16C 29/02
[52] U.S. Cl. ........................................ 384/7; 384/10; 384/29; 384/30; 384/56
[58] Field of Search ............... 384/7, 9, 10, 25-32, 384/35, 37, 38, 42, 56, 59, 218, 301

[56] References Cited

U.S. PATENT DOCUMENTS

| | | | |
|---|---|---|---|
| 2,198,039 | 4/1940 | Onions et al. | 384/49 |
| 2,965,734 | 12/1960 | Timmerman | 384/29 X |
| 3,087,038 | 4/1963 | Bethke | 384/9 X |
| 3,402,574 | 9/1968 | Hauptman | 384/56 X |
| 3,614,179 | 10/1971 | Hosken | 384/56 |

FOREIGN PATENT DOCUMENTS 532082  1/1958  Belgium ............................. 384/59

Primary Examiner—Thomas R. Hannon
Attorney, Agent, or Firm—Joseph B. Taphorn

[57] ABSTRACT

A bearing construction interposes the coils of one or more coil springs between bearing surfaces. In one embodiment a bearing coil spring is wrapped around a shaft several times. The bearing coil spring may be freely mounted on a more substantial race coil retainer centered on the shaft. In another embodiment toroidal coil springs separated by disc races extend circularly about the shaft. In linear bearing construction, the bearing coils are in planes parallel to the line of shaft movement. Other embodiments of the invention involve disengageable shafts having complementary centering end-faces accommodating misalignment through the yieldable action of the bearing spring coils, shafts and housings having non-circular cross-sections, and shafts and housings not having completely complementary surfaces to enable interference fit and positional control.

2 Claims, 4 Drawing Sheets 5,051,000

LINEAR COMPENSATING BEARING

BACKGROUND OF THE INVENTION

1. Field of the Invention

This invention relates to bearings, and more particularly to a bearing utilizing spring coils.

2. Description of the Prior Art

The prior art includes U.S. Pat. Nos. 1,376,043 (Sherwood); 670,382 (Caldwell); 4,514,098 (Ippolito); 3,918,772 (Van Damme); 2,667,389 (Smith); 143,950 (Allen); 1,398,219 (Acheson), and 2,915,089 (Horsting). Sherwood shows a spiral bearing material 3 of rubber that is fixed to the bearing pedestal 2 and lubricated by water. Caldwell shows use of a bearing bushing 3 in which are seated reversely-wound wire coils 12 of case-hardened steel. Ippolito show use of a closed, helical, coiled spring 42 whose coils surround the bearing pin 12. Van Damme shows a coil spring 14 whose coils embrace the shaft 15 and are fixed with respect to the bushing 11. Smith shows a unitary bearing structure 12 incorporating a thin and wide ribbon or strip-like material 18 coiled or wound axially upon itself; in FIG. 8 he suggests substituting a thin crinkled metallic ribbon or strip 32. Allen shows an axle-box formed by casting metal on a helically wound wire core A. Acheson shows a spiral lubricating material 1. Horsting shows a coil spring 10 comprised of a large diameter coils 11 which engage the interior of an oil well casing 5 and small diameter coils 12 which engage a pipe 7; all of the coils are concentric with the pipe 7.

SUMMARY OF THE INVENTION

A main objective of this invention is to provide a bearing which can compensate for misalignment in mechanical mechanisms. Tools such as molds, dies, tool fixtures, equipment, etc.; as well as vehicles, toys, furniture and other mechanisms; are some examples of items subjects to misalignment. Misalignment can occur because of dimensional discrepancies, thermal differences, materials with different coefficients of expansion, strain, material growth or contraction with time or exposure, etc. Misalignments result in galling, binding, seizing and other detriments to function.

Accordingly, it is another object of the invention to reduce galling, binding, seizing and other detriments to function in tools.

Another object of the invention is to provide an improved bearing, and further, one that is yieldable, and still further, one that is self-centering.

Other objects of the invention are a bearing that is simple of construction, easy and inexpensive of manufacture, and effective and enduring in operation.

These objects of the invention are accomplished through a new low-friction bearing that utilizes a wrap-around coil spring whose individual coils are interposed between the shaft and the bearing housing. The inner surfaces engage the shaft while the outer surfaces engage the bearing housing. In a preferred embodiment of the invention, the bearing coil spring is mounted on a more substantial coil spring mounted on the shaft, the substantial coil spring defining a helix for the bearing spring and constituting a race for its coils. In another embodiment, a plurality of bearing toroidal coil springs are arranged circumferentially about the shaft and separated from each other by washers (disc races) loosely fitted on the shaft and within the bearing housing.

In a linear compensating bearing wherein the main movement of the shaft is axially of the bearing housing, the coils in the various embodiments are arranged to lie in planes parallel to the line of movement of the shaft relative to the bearing housing. In the case where the bearing spring is mounted on a more substantial right-hand helix spring, the bearing spring would be wound with a left-hand helix to properly align its coils with the linear movement.

Tools such as molds, dies, tool fixtures, and other equipment are provided with studs or shafts on some of their parts which are intended to be received in complementary apertures in other parts to precisely locate and/or hold the parts with respect to each other. As suggested earlier, misalignment of the studs and apertures will result in galling, binding, seizing, and other detriments to function.

A linear compensating bearing of the instant invention can be advantageously utilized to effect realignment and/or accommodate non-alignment. To this end a bearing is located in an enlarged aperture, and the bearing shaft formed with a centering end-face intended to be engaged by a complimentary end-face on a matching stud or shaft of another part. As the two shafts engage, some coils of the bearing coil spring will undergo compression to allow the bearing shaft to align with the other-part shaft through the centering action of the end faces while accommodating endwise movements of the shafts. While yielding to the misalignment of the oncoming shaft, the shaft bearing also exercises a continuing force tending to right the misalignment.

Thus it is a feature of the invention that it will accommodate misalignment of mating parts whether due to permanent problems such as dimensional discrepancies or thermal differences or materials with different coefficients of expansion, or time variant ones such as strain or material growth.

An advantage of the invention hence is that galling, binding, seizing, and other detriments to function are thus reduced, if not eliminated.

BRIEF DESCRIPTION OF THE DRAWINGS

These and other objects, features, and advantages of the invention will become apparent in the following detailed description of preferred embodiments of the invention, taken in conjunction with the appended drawings in which.

DETAILED DESCRIPTION OF PREFERRED EMBODIMENT

Figure 1:
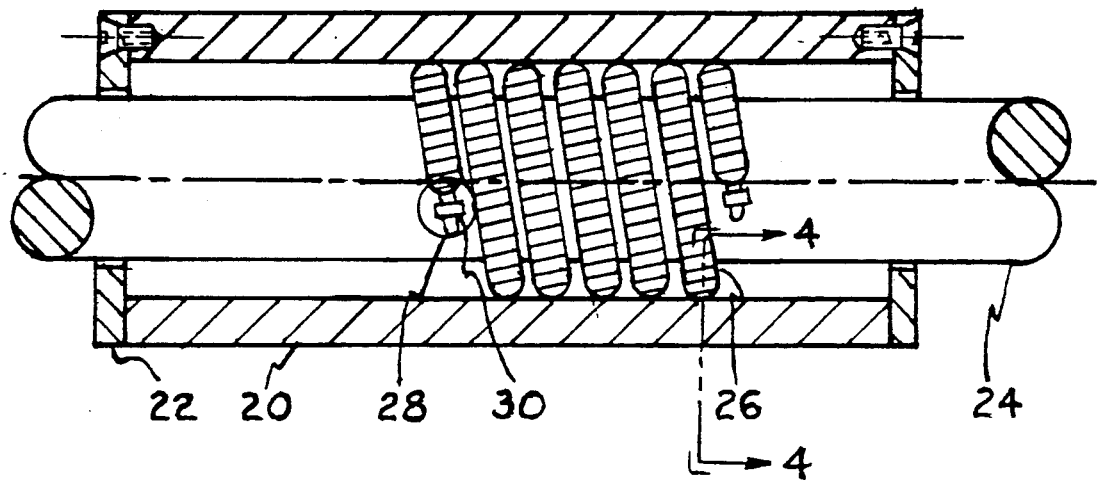
FIG. 1 is a longitudinal sectional view through a bearing constructed with a coil spring itself extending in a helix about a shaft.
Figure 2:
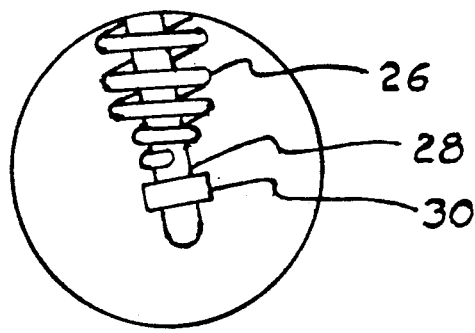
FIG. 2 is an exploded view of the circled part in FIG. 1 to show details of an end of said spring.
Figure 3:
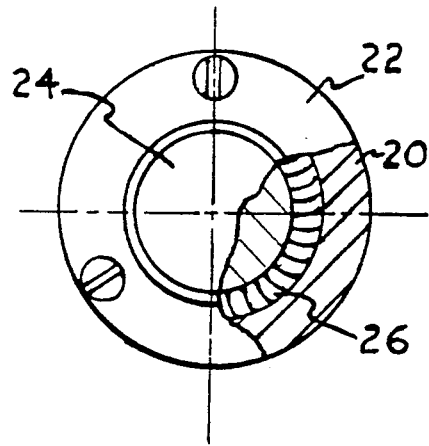
FIG. 3 is an end view of the bearing of FIG. 1.
Figure 4:
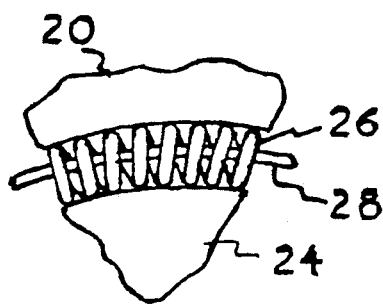
FIG. 4 is an inversion and enlargement of the view taken along the section line 4—4 of FIG. 1.

Referring now to FIGS. 1–4 of the drawings, there is shown therein a bearing construction including a cylindrical housing 20 having end plates 22 secured thereto. The end plates have circular holes in them to loosely receive a round shaft 24 which extends through the housing 20. A bearing coil spring 26 extends in a helical path about the shaft and is of such diameter that its coils fill the space between the shaft and the housing and form a bearing interacting there-between that supports, guides and reduces friction. Preferably the planes of the coils include the line of the direction of relative movement between the shaft and the housing, in this case assumed to be primarily linear rather than rotary. Thus the planes of the coils are shown as being disposed lengthwise of the shaft.

The helix of the bearing coil spring may be maintained by the employment of a second or race coil retainer 28 of more substantial construction. The race coil retainer 28, whose individual coils surround the shaft 24, is threaded through the coils of the bearing spring 26, and mounts at its end clips 30, or facsimile thereof, which limit the excursion of the bearing spring 26 by engaging its reduced ends (see FIG. 2). The reduced ends are free of the clips 30 to allow free rotation of the bearing spring about its spiral axis.

In action, linear motion of the shaft 24, will include rolling action of the aligned coils, tending to produce minimum friction. The bearing spring 26, being elastic, can adjust should individual coils be taking up more than their share of the friction load. Individual coils of the spring 26, being elastic, can compress or give under unusual bearing loads to prevent injury to the bearing parts. The individual coils of the bearing spring 26, being loosely mounted on the race retainer 28, can adjust laterally under abnormal bearing loads to accommodate some lateral shifting between the parts. Moreover, the race retainer 28, being free floating with respect to the shaft 24, and housing 20, can move along with respect to both, thereby readily accommodating rolling action of the coils of the bearing spring 26. Being elastic, it can also accommodate repositioning between the sets of coils of successive loops of the bearing springs 26, so that the bearing loads can be better distributed there-between and minimized.

Figure 5A:
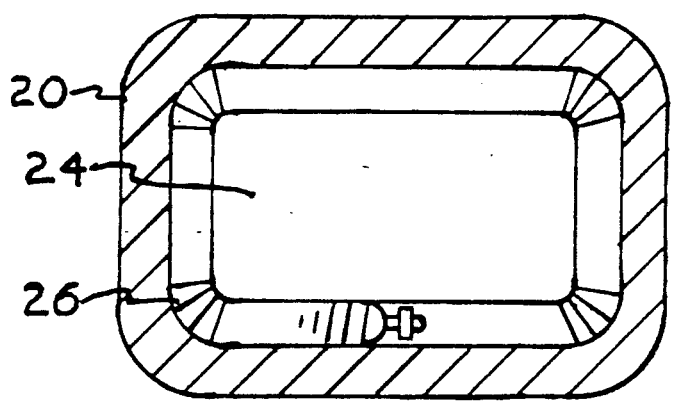
FIGS. 5A, 5B, 5C, and 5D are cross-sectional views of different bearing geometries in which the invention can be advantageously used.
Figure 5C:
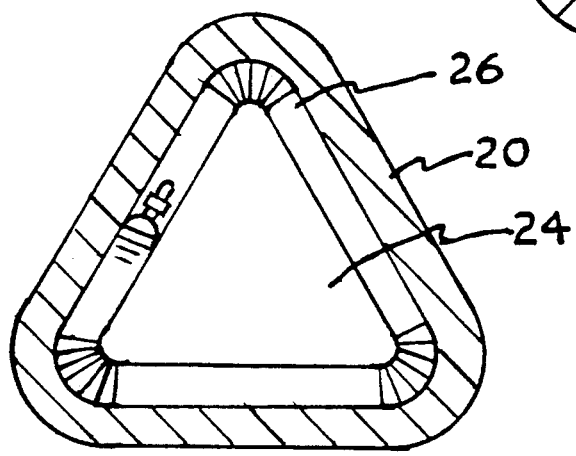
Figure 5B:
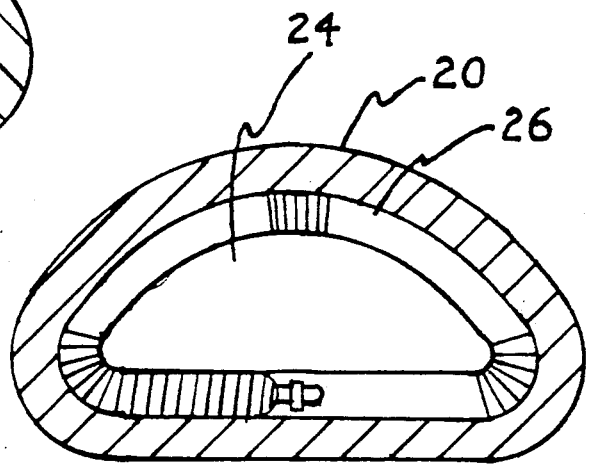
Figure 5D:
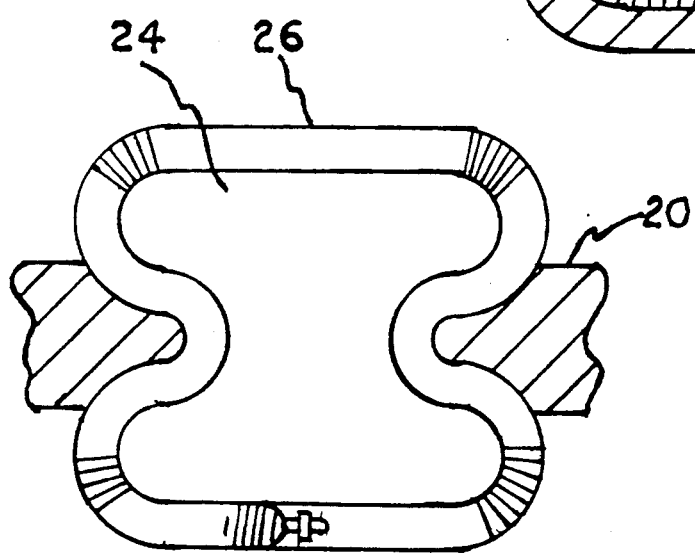

FIGS. 5A to 5D show that the bearing construction of the invention can be advantageously employed with any geometric cross-section of the shaft 24 and complementary cross-section of the housing 20, such as in splined shafts. Thus FIG. 5A shows rectangular construction. FIG. 5B shows a hemi-cylindrical construction, FIG. 5C shows a triangular one. FIG. 5D shows a double-lobed construction.

It should be appreciated that while the bearing constructions have been shown with fully complementary bearing surfaces, not fully complementary surfaces may also be employed as in 5D. Designed interference fit between coil 26, housing 20, and shaft 24 gives means to provide positional control.

Figure 6:
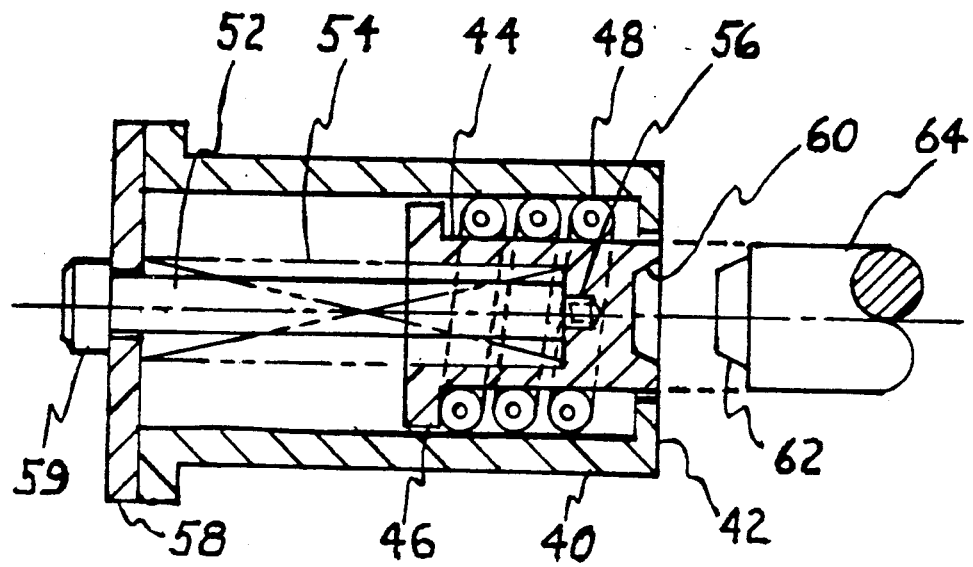
FIG. 6 is longitudinal sectional view through a bearing construction for a shaft having a disengageable portion.
Figure 7:
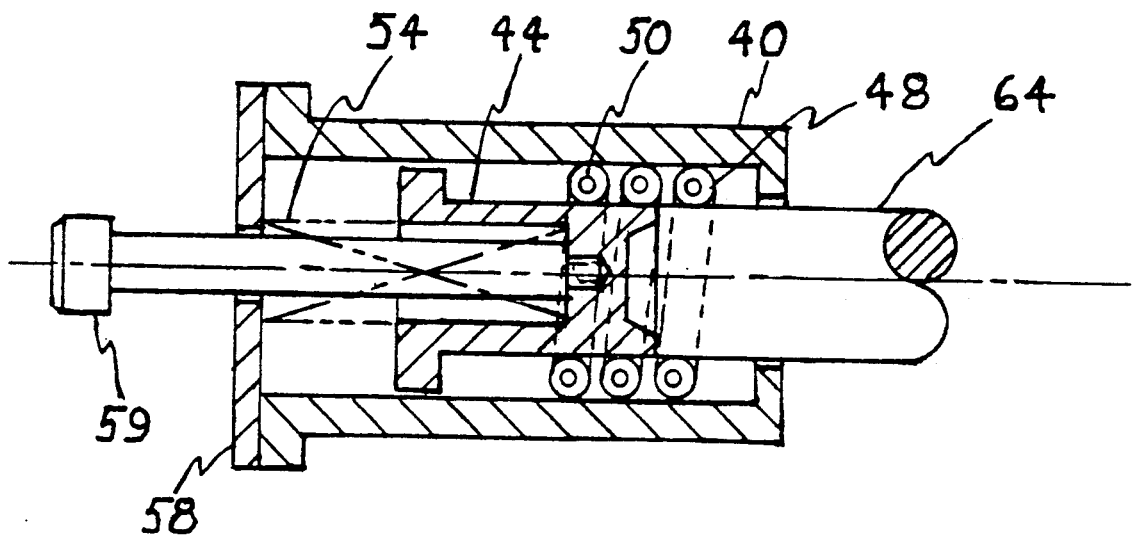
FIG. 7 is the same longitudinal sectional view but with the shaft engaged.

FIGS. 6 and 7 show a disengageable shaft bearing construction in the disengaged and engaged shaft conditions, respectively. A housing 40 has an integral end wall 42 formed with an opening for loosely receiving the free end of the shaft 44 loosely fitting within the housing 40. The other end of the shaft 44 is formed with a radially extending flange 46 for loosely fitting the shaft within the housing and for retaining one end of a bearing coil spring 48 disposed in a helix about the shaft 44 by having its coils centered on a race coil retainer 50 whose coils are centered on the shaft 44.

The flanged end 46 of the shaft 44 is hollowed to not only receive a limit pin 52, but also one end of a compression coil spring 54. The end of the pin within the shaft 44 is formed with a reduced threaded end 56 which is received in a complementary and threaded aperture in the shaft, whereby the pin and the shaft are removably secured together. The other end of the pin 52 extends loosely through an opening in an end wall 58 secured to the housing 40, where it is formed with an enlarged head 59 which limits the inward movement, under the action of the compression spring 54, of the pin 52 threadedly secured to the shaft 44, to fix the position of the other end of the shaft 44 in the opening in the housing integral end wall 42. The inward movement will have been guided by the coils of the bearing spring 48 interacting between the shaft 44 and the housing 40. The length of the race coil spring 50, and hence of the bearing coil spring 48, is not of such length as to introduce a force sufficient to offset the effectiveness of the compression coil spring 54.

The end of the shaft 44 in the opening in the housing integral end wall 42 is formed with a conical receiver pocket 60 intended to receive the cone shaped end 62 of a shaft 64 intended to be aligned with the shaft 44. The geometry of the end faces is intended to have a centering effect on the oncoming shaft 64 with an off-center force being yieldably taken up by the coils of the bearing spring 48 as they roll on the surfaces of the shaft 44 and housing 40. Thus a smooth and precise entry of the shaft 64 is assured. Other complementary geometries such as pyramids may be employed on the end faces as long as they assure shaft alignment and/or interlock.

As best seen in FIG. 7, the compression coil spring 54, interacts between the housing end wall 58 and the shaft 44, to retain the shaft 44 in engagement with the alignment shaft 64 during the latter's presence within the housing 40. It should also be observed that the bearing spring 48 may embrace the oncoming alignment shaft 64.

Figure 8:
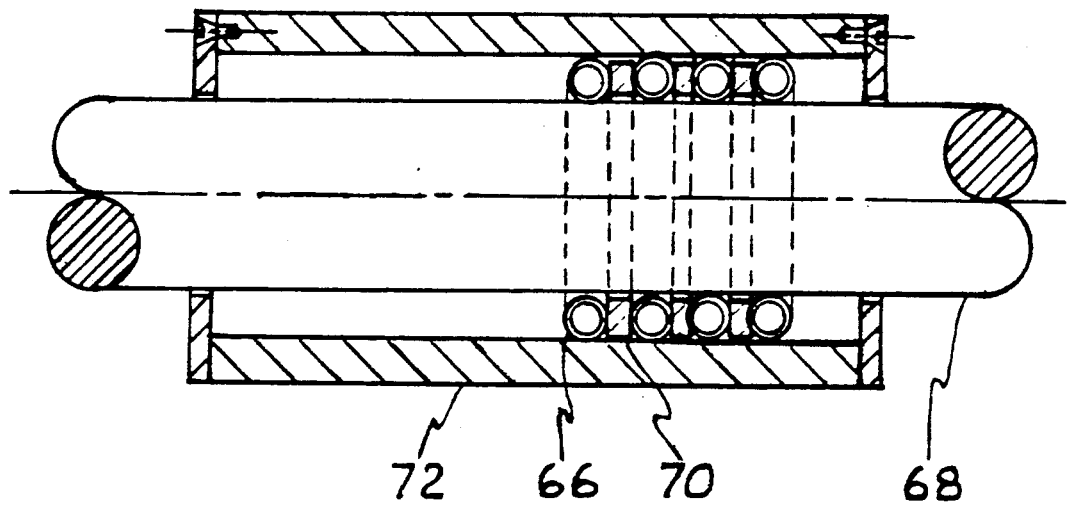
FIG. 8 is a longitudinal sectional view through a bearing construction with a plurality of toroidal coil springs extending circularly about an extended shaft.
Figure 9:
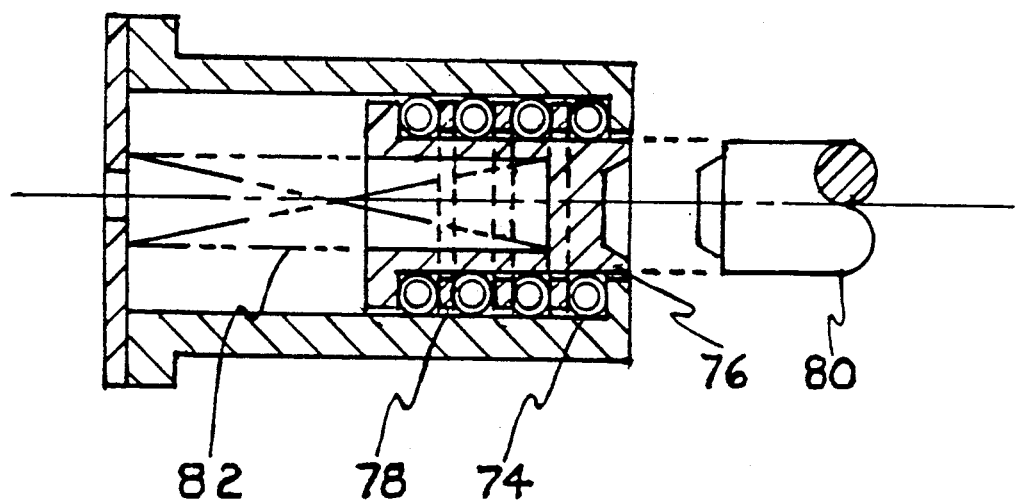
FIG. 9 is a longitudinal sectional view through a bearing construction with a plurality of toroidal coil springs extending circularly about a shaft having a disengageable portion.

Modified bearing constructions are shown in FIGS. 8 and 9. Here circularly wrapped toroidal, rather then helically wrapped, coil bearing springs are employed.

FIG. 8 shows a through-shaft bearing constructing paralleling that of FIGS. 1 to 5. However, instead of a helical coil bearing spring, a set of parallel bearing toroidal coil springs 66 are circularly arranged about a shaft 68 and separated by disc races 70.

As with the helical coil springs, axial movement of the shaft relative to the housing 72, is accommodated essentially frictionlessly by the rolling action of the individual coils. Radial motion to the shaft 68 is yieldably accommodated by the same coils.

FIG. 9 shows a disengageable shaft bearing construction paralleling that of FIGS. 6 and 7. However, instead of a helical bearing spring, a set of parallel bearing coil springs 74 are circularly arranged about a shaft 76 and separated by disc races 78. Again, the coils of the bearing springs 74 provide rolling action that is almost friction free. These same coils, while yieldably accommodating mis-alignment of the oncoming shaft 80, will act through the shaft 76 to urge the shaft 80 to its proper transverse position. It should be observed that no limit pin is employed, as the toroidal springs 74 and spacers 78 act to limit the outward movement of the shaft 76 under the action of a compression spring 82. It should also be observed that once the shaft 76 is moved slightly inward, the coil springs 74 are free to roll on the shaft and bearing housing surfaces.

In operation, each coil of a bearing spring, whether helical or toroidal, rolls, upon axial movement of the shaft with respect to the housing, on the respective bearing surfaces. As with ball bearings, the bearing springs will displace themselves one-half the distance the shaft moves. As not with ball bearings, the bearing spring coils provide many, many bearing contact points evenly distributed over the bearing surfaces.

If a sharp impact (shock) is introduced to the shaft or to the housing, the bearing springs structure will yield (be forgiving) by the inherent ability to skew or buckle (hoop) in reaction to the force. Thus unlike a solid bearing which will be damaged and/or will peen the ways of the slide or pin under impact and result in damage such as galling especially at higher or differential temperatures, the individual coils of the bearing spring will bend to yieldably accommodate a deflection while trying to eliminate it.

This feature of the invention is especially useful to align disengageable shafts. When a misaligned disengaged shaft encounters a bearing shaft which aligns with the now engaged shaft through the centering effect of their complementary cone shaped end faces, the bearing spring yields but acts at all times as a bearing for the axial movement of the shaft.

It will be appreciated that a bearing constructed according to the instant invention is simpler of construction and easier of manufacture than ball bearing assemblies. One wraparound coil bearing spring or a few, coil bearing springs substantially reduces the number of parts, and the time for assembly thereof. Furthermore, the tolerance of the component parts can be relaxed, as the bearing spring coils will adjust to the dimensions.

The inherent ability of the coils to adjust to the dimensions enables the bearing construction to compensate for thermal variations and differences, and for time and exposure variations whether planned or not. It also enables linear bearing cross-sectional shapes of all kinds as the coils will adjust to all angles. It also enables various degrees of interference fit to be designed between the shaft and its housing, providing bearings yet positional control and fixed loads.

It will be appreciated that a new and improved bearing structure has been invented that has general application, but is particularly useful in linear bearings. It will also be appreciated that changes and modifications may be made in the disclosed embodiments without departing from the inventive concepts involved. It is intended that the scope of the invention be limited only by the spirit and scope of the appended claims.

What is claimed is:

1. In a bearing, a housing, a shaft received within the housing, and a coil spring surrounding the shaft and so that its coils are in bearing engagement between the shaft and the housing and aligned in the direction of shaft movement, wherein the shaft is essentially contained within the housing and biased to a home position therein, wherein one end of the shaft has an engagement face, and the housing has an opening for exposing the shaft face to engagement with an external element, wherein the shaft engagement face has a centering contour intended to bring an oncoming external element having a complementary contour on its mating face and the shaft into alignment with each other.

2. A bearing according to claim 1, wherein the centering contours are cone-shaped.

* * * * *